United States Patent [19]
Oshima

[11] 3,846,813
[45] Nov. 5, 1974

[54] CAMERA WITH FILM CARTRIDGE

[75] Inventor: Shigeru Oshima, Tokyo, Japan

[73] Assignee: Fuji Photo Film Co., Ltd., Kanagawa, Japan

[22] Filed: Oct. 24, 1973

[21] Appl. No.: 409,118

[30] Foreign Application Priority Data
Oct. 25, 1972 Japan............................ 47-106972

[52] U.S. Cl................ 354/213, 354/203, 354/204, 354/206, 354/275, 242/71.1
[51] Int. Cl....................... G03b 17/42, G03b 1/22
[58] Field of Search.......... 354/212, 213, 203, 204, 354/206, 275; 242/71.1

[56] References Cited
UNITED STATES PATENTS
| | | | |
|---|---|---|---|
| 1,531,182 | 3/1925 | Hartmann | 354/212 |
| 1,676,037 | 7/1928 | Lowkrantz | 354/212 |
| 2,395,828 | 3/1946 | Kallusch | 354/204 |
| 2,409,605 | 10/1946 | Bolsey | 354/275 |
| 2,931,283 | 4/1960 | Schreiber | 354/213 |

*Primary Examiner*—Robert P. Greiner
*Attorney, Agent, or Firm*—Sughrue, Rothwell, Mion, Zinn & MacPeak

[57] ABSTRACT

A photographic camera adapted for use with a film cartridge in which the film in the cartridge contains only one perforation per frame for advancing the film, containing a claw containing lever for advancing the film from a beginning position to a shutter release position, a film feed lever engagable with the claw containing lever, a means for holding the claw in a position for release when the shutter button of the camera is pressed, a means for releasing the shutter blade of the camera when the claw containing lever is returned upon depression of the shutter button from the shutter release position to the beginning position.

5 Claims, 8 Drawing Figures

PATENTED NOV 5 1974
3,846,813
SHEET 1 OF 2
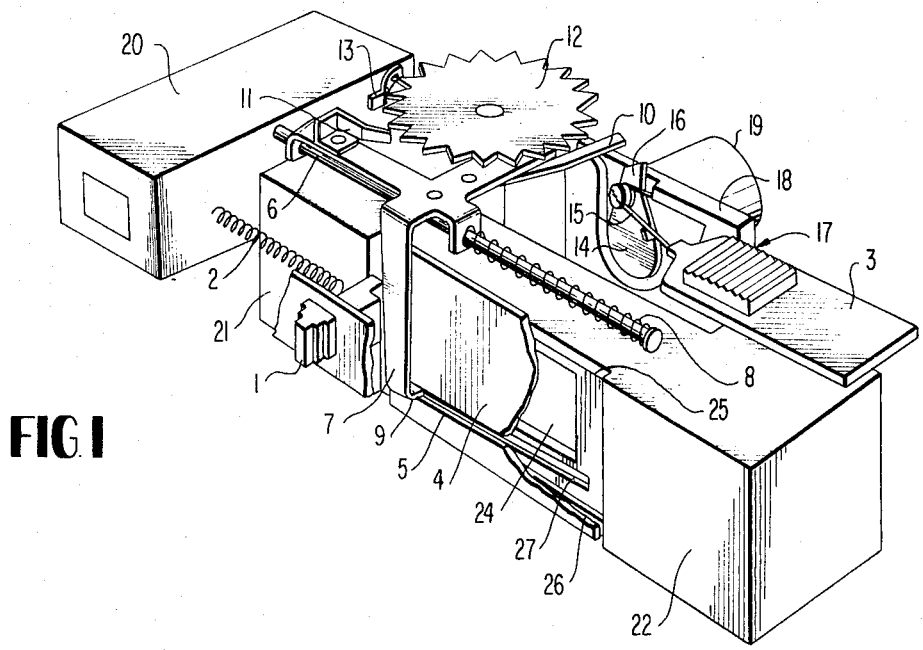
FIG. 1
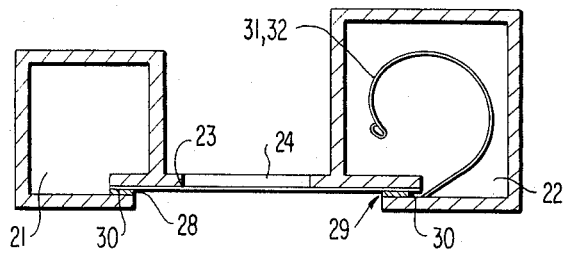
FIG. 2
FIG. 3
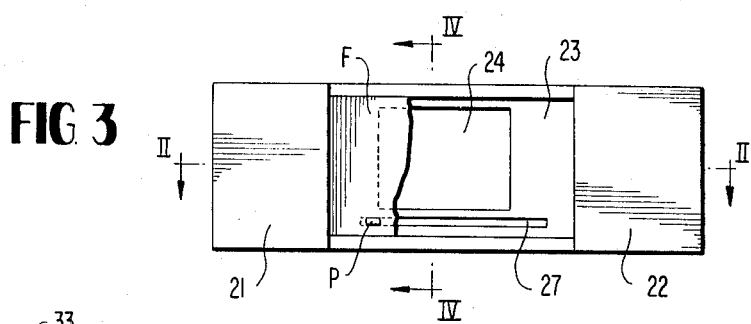
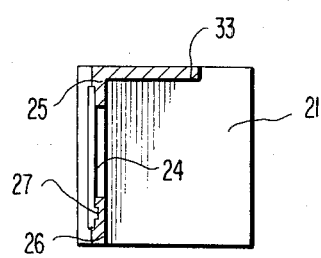
FIG. 4

3,846,813

CAMERA WITH FILM CARTRIDGE

BACKGROUND OF THE INVENTION

1. Field of the Invention

This invention relates to a photographic camera adapted to be used with a film cartridge, and more particularly to a simple camera in which a roll film cartridge is connected with an exposed film container by way of an interconnection plate and a film is fed along the interconnection plate by means of a claw engaging the perforations of the film.

2. Description of the Prior Art

A cartridge which has an unexposed film container and an exposed film container connected with the unexposed film container by way of an interconnection member is known in the art. In such a cartridge, the film loaded therein is taken up by means of a take-up shaft provided in the exposed film container and associated with a wind up lever in the camera, and by rotating the take-up shaft, the film is wound up on the take-up shaft. Further, in such a cartridge, the wind up of the film is automatically stopped after a length of the film corresponding to one frame is fed by use of a claw engaged with the perforation of the film. In such a type of cartridge, the construction of the cartridge necessarily is complicated in order to shield the film from light at a portion where the film wind up mechanism of the camera engages the take-up shaft of the cartridge. In addition, in a camera of this type in which a cartridge is loaded the mechanism in the camera inevitably becomes complicated since the film wind-up mechanism is made separate from the film feed mechanism.

In view of the above described defects of the conventional camera, it is a primary object of this invention to provide a photographic camera which is simple in construction and which does not need a film take-up shaft in the cartridge.

Another object of this invention is to provide a photographic camera of simple construction in which the film is fed and stopped by means of a simple mechanism.

These and other objects and features of the present invention will be made apparent from the following detailed description of the preferred embodiments of the invention taken in conjunction with the accompanying drawings.

SUMMARY OF THE INVENTION

A photographic camera adapted to receive a film cartridge in which a film having one perforation per frame is loaded comprising; a rail stationarily provided in the camera extending parallel the film feed direction, a lever with a claw slidably and swingably mounted on the rail, the lever with the claw being slidable between a film feed start position and a shutter release position and normally urged toward the start position, the lever with the claw being swingable between an engaging position where the claw is engaged with a perforation of the film and a release position where the claw is released from the perforation of the film and urged toward the engaging position, a film feed lever which is engagable with the lever with the claw to slide the lever with the claw toward the shutter release position, the film feed lever being urged in a direction opposite to the film feed direction, a claw holding means which holds the claw in a position where the lever with the claw is in the shutter release position and in the engaging position overcoming the force urging the lever toward the start position, a shutter blade provided behind the taking lens of the camera and urged to the closed position, a shutter release member provided on the lever with the claw which opens the shutter blade when the lever with the claw moves from the shutter release position to the start position, and a shutter button movable up and down and urged to move upward and provided above the shutter release position of the lever with the claw so that the shutter button may be engaged with the lever with the claw and swing the lever with the claw from the engaging position to the release position when the shutter button is depressed, whereby the lever with the claw is slid back to the start position when the lever with the claw is swung to the release position and releases the shutter on the way back to the start position.

BRIEF DESCRIPTION OF THE ACCOMPANYING DRAWINGS

FIG. 1 is a perspective view showing the mechanism in a camera in accordance with one embodiment of the present invention, FIG. 2 is a horizontal sectional view of a cartridge used in the camera shown in FIG. 1, FIG. 3 is a rear view of the cartridge shown in FIG. 2, FIG. 4 is a vertical sectional view of the cartridge taken along the line IV—IV in FIG. 3, FIG. 5 is a perspective view of the main portion of another embodiment of the cartridge used in the camera in accordance with this invention, FIG. 6 is a partial vertical sectional view of another embodiment of the camera in accordance with this invention, FIG. 7 is a horizontal sectional view showing the relationship between the camera and the cartridge loaded therein, FIG. 8 is a perspective view of a guide member provided in the camera.

DETAILED DESCRIPTION OF PREFERRED EMBODIMENTS

Figure 5:
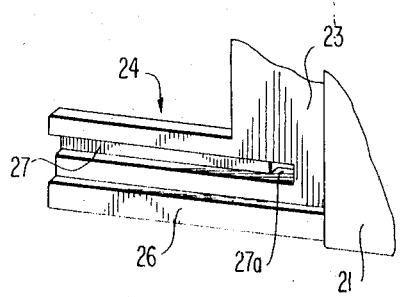

Referring to FIGS. 2, 3 and 4 showing the construction of the film cartridge to be used in the camera of this invention, an unexposed film container 21 and an exposed film container 22 are connected with each other by way of an interconnection plate 23. The interconnection plate 23 is provided with an aperture 24 through which a light image passes. The interconnection plate 23 is provided with a pair of protrusions 25 and 26 above and below the aperture 24 to guide the film therealong. A groove 27 is provided on the interconnection plate 23 along the lower edge of the aperture 24. At the outlet 28 of the unexposed film container 21 and at the inlet 29 of the exposed film container 22 are attached light shielding cloth members 30. In the exposed film container 22 is provided a pair of soft curved springs 31 and 32 for guiding the upper and lower marginal portions of the film. In such a film cartridge, a film F is retained in the unexposed film container 21 and fed along the interconnection plate 23 with the emulsion surface faced rearward and received in the exposed film container 22. As the film F is fed into the exposed film container 22, the film F is guided along the springs 31 and 32 and rolled up therein. The feed of the film F is performed by means of a claw in the camera which engages a perforation P of the film and moves horizontally. The claw is movable in and along the groove 27 provided on the plate 23. A reinforcement plate 33 is fixed to the interconnection plate 23 at right angle with the plate 23 as shown in FIG. 4

Now the construction of the mechanism in the camera in accordance with the present invention using a film cartridge as described above will be described with reference to FIG. 1. A film feed lever 1 is provided at the back of the camera, the feed lever 1 being movable back and forth along a guide on the camera not shown. This film feed lever is urged leftward by means of a coil spring 2. The reference numeral 3 indicates a shutter button provided on the top of the camera, which is movable up and down. A film pressure plate 4 which has a slit 5 is provided on the back of the camera. A rail 6 is mounted on the camera body and a lever 7 is slidably mounted on the rail 6. A coil spring 8 is provided around the rail 6 and engaged with the lever 7 to urge the lever leftward. This lever 7 has a film feed claw 9 at the end thereof. The upper portion of the lever 7 is provided with a plate spring 10 which is slidable along the upper edge of a rail 18 located at the front portion of the camera body and is operated in effect to urge the lever 7 to rotate counterclockwise when viewed from the right end of the rail 6. By the counterclockwise rotation of the lever 7, the claw 9 at the lower end of the lever 7 is put into engagement with a perforation of the film F. The lever 7 is provided at the top thereof with a spring projection 11 which is engaged with the teeth of a film counter 12. A spring 13 is secured to a finder 20 to control the rotation of the film counter 12. The view finder 20 is located beside the camera body to hold the film counter control spring 13 and to support the left end of the rail 6. In the front side of the camera, a shutter mechanism is provided. The shutter mechanism comprises a shutter blade 14 rotatable in a plane perpendicular to the optical axis of the taking lens of the camera 19, a spring 15 to urge the shutter blade 14 in a clockwise direction and a shutter block 17. The shutter blade 14 has at its top end a ramp portion 16. The shutter block 17 has at its top a spring guide rail 18 to guide horizontally the plate spring 10 as described hereinbefore.

In the above-described camera, the lever 7 is moved rightward by moving the film feed lever 1 rightward since the inner end of the film feed lever 1 is engaged with the lever 7. Upon the rightward movement of the lever 7, the spring 11 mounted thereon rotates the counter 12 by one tooth which represents a film feed of one frame. At this time, the plate spring 10 slides on the rail 18 of the shutter block 17. Since the lever 7 is urged counterclockwise, the claw 9 engaging the perforation of the film moves the film while the lever 7 is moved rightward, and accordingly the film is fed by one frame. The plate spring 10 moves over the ramp portion 16 of the shutter blade 14 and rises again on the top end of the shutter block 17. The lever 7 is then moved to the right extreme position where the claw 9 abuts on the right end of the slit 5 and the top portion of the lever 7 having the plate spring 10 comes under the shutter button 3.

When the film feed lever 1 is released, the lever 1 returns to the left by the tension coil spring 2. However, since the claw 9 of the lever 7 is still in engagement with the perforation of the film F, the lever 7 remains under the shutter button 3 if the film is held in the advanced position. Actually, the film F is held in the advanced position since the friction between the film and the cartridge and the pressure plate is large enough to hold the film in the advanced position overcoming the spring force of the coil spring 8. Thus, the film F is fed toward the exposed film container 22 by one frame. In order to assure the holding of the film, it is desirable that the pressure plate be pressed on the cartridge to securely pinch the film between the pressure plate and the cartridge. One means to increase the friction between the film and the cartridge and the pressure plate so as to securely hold the film will described hereinafter by reference to FIG. 6.

Now, if the shutter button 3 is depressed under the above-described state where the top portion of the lever 7 is under the shutter button 3, the lever is moved in the counterclockwise direction overcoming the spring force of the plate spring 10. Then, the claw 9 of the lever 7 is disengaged from the perforation of the film F, accordingly. Therefore, the lever 7 is made free to move back to the left by means of the compression coil spring 8. Then, the plate spring 10 strikes the ramp portion 16 of the shutter blade 14 on the way back to the left sliding along the rail 18 and opens the shutter blade 14 by rotating the blade counterclockwise. Thus, the shutter is opened and the film F is exposed to a light image through the taking lens 19 and an aperture which had been closed by the shutter blade 14. After the shutter is opened by the plate spring 10, the shutter blade 14 is closed again by the shutter spring 15 and the exposure is completed. When the lever 7 is moved backward to the left, the film counter 12 does not rotate because of the shape of the spring projection 11 and the control spring 13. The claw 9 is again put into engagement with the perforation of the film F when the lever 7 returns to the left or when a subsequent wind up starts.

As described above, the film is fed to the extent of one frame by means of a simple claw mechanism comprising a claw engaging a perforation of the film from backside of the film. Further, with this simple construction, the mechanism is prepared for a subsequent film feed immediately after the exposure. In other words, the camera in accordance with the present invention is capable of feeding the film, cocking the shutter and preventing a double exposure by means of a simple mechanism.

Now referring to FIG. 5, a means for holding the lever 7 in the advanced position until the shutter button is depressed is shown. At the right extreme position of the groove 27, a recess 27a is provided so that the claw 9 may be engaged with the recess 27a when the claw 9 reaches the end of the groove 27. After the claw 9 is engaged with the recess 27a, the claw 9 will not slip from the recess and accordingly there is no fear of an unexpected return of the lever 7 until the shutter button 3 is depressed.

In such a camera as described hereinabove, the shutter is not cocked unless the film is loaded. Therefore, there is no need to confirm the presence of film in the camera. Further, by providing an elongated perforation after the last perforation of the film, it becomes possible to prevent the release of the shutter after the last frame of the film is fed. If the film is provided with an elongated perforation after the last perforation, the claw 9 is not held in the advanced position but is moved backward by the length of the elongated perforation after the claw is moved rightward to feed the film. Therefore, the lever 7 is not under the shutter button 3 when the lever 7 is released after the last winding of the film. Since the lever 7 is not under the shutter button 3, the shutter is not released even if the shutter button 3 is depressed. Alternatively, the elongated perforation after the last perforation is made long enough that it extends close to the previous perforation. If the elongated perforation is made of such a length, the film is not fed at all after the last frame of the film is fed. In this case, however, the film is exposed each time the film feed lever 1 is moved rightward. The exposed area of the film is an area after the last frame of the film, and accordingly, there is no problem regardless of the number of times the film might be exposed. Further, the cartridge can be taken out of the camera in the light since the portion of the film exposed in the aperture of the cartridge is the area of the film after the last frame of the film.

In the embodiment shown in FIG. 1, the film F passes through the tunnel formed by the protrusions 25 and 26 between the interconnection plate 23 and the pressure plate 4. Since the photosensitive emulsion surface of the film is the front surface of the film, the image is sharply focussed on the surface of the film by positioning the rear surface of the interconnection plate 23 in the focal plane.

Figure 6:
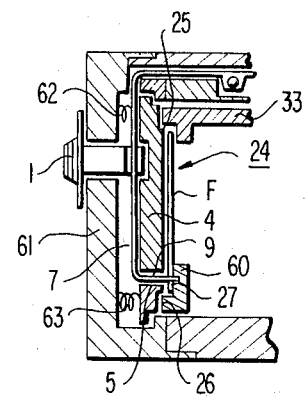

FIG. 6 shows another example of the device which brings the film F into the aperture of the camera. Along the upper edge of the groove 27 of the cartridge is provided a protruded rail 60. The pressure plate 4 is mounted to the back cover 61 of the camera with springs 62 and 63 which push the pressure plate 4 forward. The pressure plate 4 is not flat in shape but has recessed steps which mate with the protrusions 25 and 26. The pressure plate 4 directly contacts the film F and pinches the film between the pressure plate 4 and the protruded rail 60 in the lower portion of the film wherein the claw 9 engages the film F. In the opposite portion of the film, the pressure plate 4 contacts the protrusion 25 to loosely pass the film therethrough. By so constructing the pressure plate 4, distortion of the film by the force of the claw 9 which is imparted only to the lower portion of the film is prevented. Further, when the force of the pressure plate springs 62 and 63 is weak, both the upper and lower portions of the film may be pressed. Where both the upper and lower portions of the film are pinched between the pressure plate and the protrusions 25 and 26, there is no need to provide the recess at the end of the groove 27 as shown in FIG. 5 because the lever is securely held in the advanced position by sufficient friction between the film and the cartridge and the pressure plate.

Figure 7:
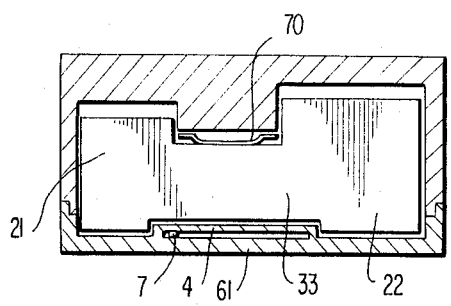

Instead of pressing the pressure plate against the cartridge in order to hold the film, the cartridge may be pressed against the back cover of the camera. For instance, as shown in FIG. 7, by providing a spring 70 in-front of the cartridge between the front face of the reinforcement plate 33 and the camera, the cartridge is pushed backward by the spring force of the spring 70 when the back cover 61 is closed. Thus, the film between the camera and the interconnection plate of the cartridge is positioned in the focal plane.

The film cartridge used in the camera has a recessed portion on the back of the interconnection plate 23 between the outlet 28 and inlet 29 thereof as shown in FIG. 2. Therefore, the cartridge can be prevented from moving back and forth in the camera by shaping the back cover or the pressure plate to have a protruded plateau to be mated with this recess.

Figure 8:
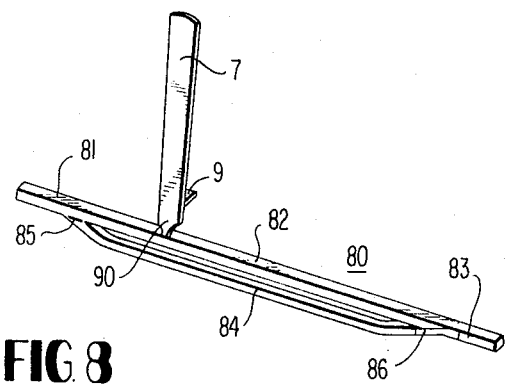

In the embodiment shown in FIG. 1, the claw 9 is in contact with the surface of the film F until the claw comes into the next perforation after the shutter button 3 is depressed. That is, the claw 9 returns to the original position sliding on the surface of the film F. Therefore, the surface of the film F is scratched. Since the perforations are provided in an edge portion of the film F, scratches do not become a problem. When the perforations are provided in the middle of the film F, the scratches cross the images on the film and accordingly become a great problem. In order to prevent the formation of scratches, a guide is preferably provided in the camera body so as to guide a part of the lever 7. For instance, as shown in FIG. 8, a pin 90 is provided at the lower end of the lever 7 beside this claw 9. The pin 90 is engaged with a groove 80 provided on the bottom of the camera and guided thereby. The reference numeral 81 indicates the position where the pin 90 is positioned when the lever 7 is in the position shown in FIG. 1. The reference numeral 82 indicates the groove through which the pin 90 passes when the film is fed, 83 indicates the position where the pin 90 is positioned when the film feed is completed, and 84 indicates a groove where the pin 90 passes together with the lever 7 when the shutter button is depressed. The springs 85 and 86 are plate springs which are held in the positions shown in FIG. 8. When the pin 90 moves rightward through the guide groove constructed as described above, the pin 90 reaches the position 83 through the position 81 and the groove 82 and moving the plate spring 86 away since the plate spring 85 is in the position as shown in the drawing. That is, the lever 7 is guided directly by the groove when the film is fed thereby. The claw 9 is of course engaged with the perforation in the film. When the pin 90 moves leftward, the pin 90 is guided by the plate spring 86 into the by-pass groove 84 and returns to the original position 81 moving the plate spring 85 away. When the pin 90 is in the by-pass groove 84, the claw 9 is separated from the surface of the film F and accordingly the film is not scratched. It will be understood that the guide groove 80 is not limited to the one which guides the lever 7 at a position close to the claw 9 but may be one which guides the lever 7 at a position close to the plate spring 10.

While the invention has been described in detail and with reference to specific embodiments thereof, it will be apparent to one skilled in the art that various changes and modifications can be made therein without departing from the spirit and scope thereof.

What is claimed is:

1. A photographic camera adapted to receive a film cartridge in which a film having one perforation per frame is loaded comprising;

a rail stationarily provided in the camera extending parallel to the film feed direction, a lever with a claw slidably and rotatably mounted on said rail, said lever with said claw being slidable between a film feed start position and a shutter release position and normally urged toward the start position, said lever with said claw being swingable between an engaging position where said claw is engaged with a perforation of the film and a release position where said claw is released from said perforation of said film and urged toward said engaging position, a film feed lever which is engagable with said lever with said claw to slide said lever with said claw toward said shutter release position, said film feed lever being urged in a direction opposite to the film feed direction, a claw holding means which holds said claw in a position where said lever with said claw is in said shutter release position and in said engaging position overcoming the force urging said lever toward said start position, a shutter blade provided behind the taking lens of the camera and urged to the closed position, a shutter release member provided on said lever with said claw which opens said shutter blade when said lever with said claw moves from said shutter release position to said start position, and a shutter button movable up and down and urged to move upward and provided above said shutter release position of said lever with said claw so that said shutter button may be engaged with said lever with said claw and swing said lever with said claw from said engaging position to said release position when said shutter button is depressed, whereby said lever with said claw is slid back to said start position when the lever with said claw is swung to said release position and releases said shutter on the way back to said start position.

2. A photographic camera as defined in claim 1, wherein said claw holding means comprises a wall of said film cartridge and a pressure plate urged to be pressed on said wall of said film cartridge to pinch said film therebetween, the force of friction between said film and said wall and said pressure plate pinching the film being greater than the urging force imparted to said lever with said claw to move said lever with said claw back to said start position.

3. A photographic camera as defined in claim 1, wherein said claw holding means is a claw holding recess provided on said film cartridge at the position to which said claw is moved when said lever with said claw is brought into said shutter release position.

4. A photographic camera as defined in claim 1, further comprising means for guiding said claw in a path through which said claw does not contact the surface of said film when said lever with said claw is moved back to said start position from said shutter release position.

5. A photographic camera as defined in claim 4, wherein said claw guiding means comprises a guide rail including two parallel rails which are combined at both ends thereof to guide a part of said lever with said claw in one of said rails when the lever is moved from said start position to said shutter release position and in the other of said rails when said lever with said claw is moved back to said start position from said shutter release position.

* * * * *